(12) United States Patent
Pöllabauer

(10) Patent No.: US 7,948,097 B2
(45) Date of Patent: May 24, 2011

(54) APPARATUS FOR ACTUATING A LOCKING ELEMENT WITH AN ELECTRICAL GENERATOR

(75) Inventor: Reinhard Pöllabauer, Vienna (AT)

(73) Assignee: EVVA-WERK Spezialerzeugung von Zylinder-und Sicherheitsschlosser Gesellschaft GmbH & Co. KG, Vienna (AT)

( * ) Notice: Subject to any disclaimer, the term of this patent is extended or adjusted under 35 U.S.C. 154(b) by 395 days.

(21) Appl. No.: 12/224,142

(22) PCT Filed: Jan. 26, 2007

(86) PCT No.: PCT/AT2007/000034
§ 371 (c)(1),
(2), (4) Date: Aug. 19, 2008

(87) PCT Pub. No.: WO2007/095649
PCT Pub. Date: Aug. 30, 2007

(65) Prior Publication Data
US 2009/0261598 A1 Oct. 22, 2009

(30) Foreign Application Priority Data
Feb. 21, 2006 (AT) .................. A 282/2006

(51) Int. Cl.
*G08B 13/08* (2006.01)

(52) U.S. Cl. .......................... 290/1 R; 290/1 E
(58) Field of Classification Search .................. 290/1 R, 290/1 E
See application file for complete search history.

(56) References Cited

U.S. PATENT DOCUMENTS

| 4,471,353 | A | 9/1984 | Cernik |
| 6,774,502 | B2* | 8/2004 | Dietz et al. .................. 290/1 R |
| 7,148,583 | B1* | 12/2006 | Shau et al. .................. 290/1 R |
| 7,332,826 | B2* | 2/2008 | Terzian et al. .............. 290/1 R |

FOREIGN PATENT DOCUMENTS

| DE | 196 20 880 A1 | 11/1997 |
| DE | 199 18 817 C1 | 9/2000 |
| EP | 0 462 316 A1 | 12/1991 |
| WO | WO 96/02721 | 2/1996 |
| WO | WO 96/18790 | 6/1996 |
| WO | WO 97/39516 | 10/1997 |

* cited by examiner

*Primary Examiner* — Tho D Ta
(74) *Attorney, Agent, or Firm* — Chapman and Cutler LLP

(57) ABSTRACT

In an apparatus, for example key (25) or locking cylinder (26), for actuating a locking element (14), having a converter (13) for converting mechanical into electrical energy, comprising a magnetic circuit (5) and an induction coil (1) through which the magnetic flux from the magnetic circuit passes, wherein the magnetic circuit (5) or the induction coil (1) is in the form of a movable component and the respective other part is in the form of a fixed component, the movable component is held by a leaf spring (7) and is arranged such that it can be deflected so as to carry out oscillating movements in only one plane.

21 Claims, 4 Drawing Sheets

APPARATUS FOR ACTUATING A LOCKING ELEMENT WITH AN ELECTRICAL GENERATOR

Figure 1:
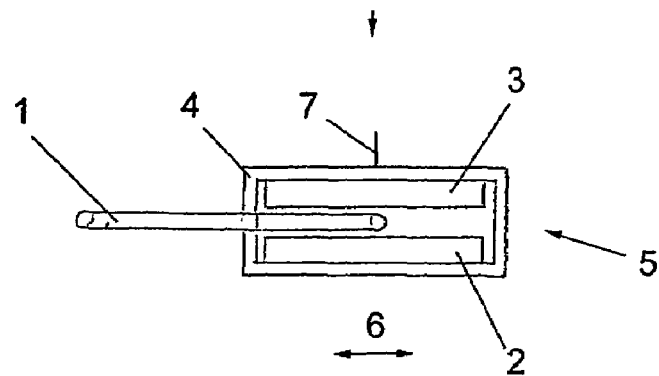

The invention relates to an apparatus, for example key or locking cylinder, for actuating a locking element, having a converter for converting mechanical into electrical energy, comprising a magnetic circuit and an induction coil through which the magnetic flux from the magnetic circuit passes, wherein the magnetic circuit or the induction coil is in the form of a movable component, and the respective other part is in the form of a fixed component.

Electrical or electronic locks, in particular cylinder locks, in addition to mechanical interlocks which are mechanically lockable with conventional keys, normally include at least one electromagnetically or power-operated locking mechanism, which is released only after an identification check. Here the electronic circuit for identification check mostly interacts, wireless or wired, with suitable identification media, wherein in the electronic evaluation circuit a check takes place if the respective identification medium has the permission for locking the lock. After successful check of the identity, then the release of the lock takes place.

For energy supply of such electrical or electronic interlocks, respectively, normally a permanent energy supply of the lock and often also of the key is necessary, and therefore, apart from the efforts for such a permanent energy supply, it has to be ensured that an uninterruptible power supply is available to maintain the function of the lock in any situation.

Electrical or electronic locks can be supplied with energy in any manner. Besides the possibility of a main connection or a backup battery, proposals are also known in which the lock or the key has a converter for converting mechanical into electrical energy. Such converters are formed, for example, as electrical generators having a magnetic circuit and induction coil through which the magnetic flux from the magnetic circuit passes, wherein the magnetic circuit or the induction coil is formed as a movable component and the respective other part is formed as a fixed component. Thereby, by the movement of the movable arranged component, an induction voltage is induced in the induction system. The movable component can be, for example, formed as a flywheel, as it is known from EP 1039074 A1. By such a formation, an autarkic energy supply is ensured since the electrical energy generated by the flywheel generator can be buffered in an energy storage and can, if necessary, be provided to the electrical circuit for the identification check or for the electrical actuation of the lock, respectively.

Flywheel generators, however, are, for example, not useful for stationary-arranged locks insofar as the flywheel can not readily be put in motion if external actuation apparatuses are to be abandoned. Flywheel generators are suitable, at the most, for integration in keys, since in this case the fly wheel, like wrist watches, is put in motion by means of the permanent carrying around and the hereby caused mechanical shocks. Another disadvantage of flywheel generators is the relative inefficient operation, since the support of the fly wheel involves considerable friction losses.

The present invention, therefore, aims to provide a converter of the initially mentioned type for converting mechanical into electrical energy, which, for example can be used for keys or locking cylinders, and which stands out through a better utilization of the introduced mechanical energy, and by means of which, for example, friction losses can be minimized. Furthermore, by means of the invention, the introduction of mechanical energy is intended to be facilitated, so that the converter, for example, is also suitable for stationary devices, such as, for example, locking cylinders.

For solving this object, the embodiment according to the invention consists in that the movable component of the converter is held by a leaf spring and is arranged such that it can be deflected so as to carry out oscillating movements in only one plane. By the mechanically movable part of the converter system being now held by a leaf spring, a friction-free guidance of the moving part is achieved, wherein by means of the design of the spring as a leaf spring, a movement is allowed in one single plane only, so that an exact guidance is ensured. By such a formation, the distances between the movable component and the fixed component can be chosen very small because, due to the exact guidance, no tolerances are to be considered. By use of a leaf spring as holder for the movable component, after a respective deflection of the component, an oscillating movement is carried out, so that in the induction coil, magnetic flux changes per time unit are generated and hence a voltage is induced. Since according to the invention an oscillation movement is provided, with each period of the oscillation, energy can be extracted from the system, and therefore it is possible to convert the introduced mechanical energy almost completely into electrical energy. By designing the holding element for the movable part as leaf spring, surface contact between the movable and the fixed part is successfully avoided so that the friction losses are eliminated.

In principle, within the scope of the invention, it is conceivable to form the magnetic circuit as the fixed component and the induction coil as the movable component as well as vice versa, to form the induction coil as the fixed component and the magnetic circuit as the movable component. Preferred, however, is an embodiment in which the induction coil is formed as fixed component and the magnetic circuit is formed as movable component, since the magnetic circuit, in particular when it comprises permanent magnets, forms an autarkic structure which is not connected by any connections with other components, whereas the induction coil has to be provided with a voltage tap.

The magnetic circuit, preferably excited to carry out mechanical oscillations, can be designed differently, wherein preferably an embodiment is provided in which the magnetic circuit has two permanent magnets arranged spaced apart in parallel to each other, wherein the induction coil is arranged in the space between the two magnets, maintaining a gap to each of them, and the movable component is arranged such that it can be deflected to carry out oscillating movements transverse to the direction of the magnetic flux.

Further, it is preferably provided that the magnetic circuit has at least one permanent magnet which is encompassed by the induction coil. The magnetic circuit itself can preferably be formed as a double-sided closed magnetic circuit. Alternatively, however, an embodiment is conceivable in which the magnetic circuit is opened on one side. The embodiment with a double-sided closed magnetic circuit, however, has the advantage that the magnetic flux thereby is divided about equally on both sides, hence the magnetic saturation of the ferromagnetic material of the magnet is reached less quickly. With the single-sided open magnetic circuit, however, only a small portion of the magnetic flux lines will close over the open part. A further advantage of the double-sided closed magnetic circuit is that here the leakage of the magnetic flux into the environment is lower, whereas the single-sided open magnetic circuit has a corresponding magnetic leakage.

In addition to the already mentioned use of two magnets, between which the induction coil is arranged, an embodiment with only one magnet is also conceivable. However, it is found that for the homogeneity of the magnetic field, i.e. the magnetic flux density, in the air gap, in which a portion of the coil is located, it is advantageous if instead of one single magnet, above or below the coil respectively, one magnet with half of the magnetic material is built in in each case.

As already mentioned, by use of a leaf spring for suspension and guidance of the movable component, an extremely efficient conversion of mechanical into electrical energy is ensured and, for example, beginning with low vibrations, mechanical energy can successfully be introduced in the converter system, resulting in a deflection of the movable component held by the leaf spring and in corresponding oscillating movements. An optimization can be made in such a manner that the resonance frequency of the mechanical system is adjusted to the frequency of the expected vibrations and the leaf spring is dimensioned accordingly. By use of a stronger spring, for example, the spring force can be increased and hence more mechanical energy can be introduced into the system. The increase of the mechanical frequency of the mechanical oscillating system results also in a performance improvement, and in this manner, higher voltages can be tapped at the coil. When the frequency of the mechanical oscillation is increased, the period duration at a constant travel covered by the oscillating mass is decreased, so that higher speeds occur. This means that the flux change in the time unit per winding of the induction coil is increased and hence a higher voltage is induced.

A further optimization of the formation according to the invention is advantageously accomplished in that the leaf spring is shaped meander-like. By such a shape, the release characteristic of the mechanical oscillating system is improved and a more robust guidance is ensured. A further improvement is accomplished in that the meander has a taper towards the engaging point at the movable part, wherein by this measure the release characteristic of the mechanical oscillating system is also improved. A further advantage is the smaller space requirement of the tapered-formed meander.

In order to avoid a collision of the oscillating system with the fixed component, the formation is preferably further formed such that the leaf spring engages the movable part outside of the oscillating plane.

The application areas of the converter according to the invention are diverse. With respect to the locking technology, the integration of the converter in a key or code carrier as well as in a locking cylinder or a lock assembly is conceivable. According to a preferred further developed formation, it is therefore provided that the converter is arranged in a lock, preferably in the cylinder housing of a cylinder lock, such that the oscillating plane of the movable component is parallel to the insertion direction of the key, wherein at insertion of the key the movable component cooperates with a driver of the key and is deflected to carry out oscillating movements. With such an embodiment it is sufficient to arrange the driver such that at insertion of the key, a collision with movable arranged part of the converter occurs, whereby the movable arranged part deflects and can freely oscillate after release, wherein at each period of the oscillating process, electrical energy can be extracted from the system. The electrical energy obtained in this manner is made available immediately for the electric circuit of the cylinder lock or the cylinder electronic, respectively, wherein the electronic code stored in the key is read and evaluated, and upon determining an access permission, the electric lock can be actuated. Therefore the electrical energy at insertion of the key is generated exactly at the point in time when it is required, wherein a buffering of electrical energy can also be eliminated for reasons of simplification.

In a further area of application it is preferably provided that the converter is arranged in the rim of the key. The energy generated during carrying around the key can here be made available immediately to the key's own electronics or, for example, can be buffered, and, at insertion of the key in a lock, made available to the lock and its control- opening and locking electronic, respectively, by means of contacts provided on the key.

The invention is described hereinafter in more detail by means of an exemplary embodiment illustrated schematically in the drawing. Therein shows: FIG. 1 to FIG. 4 the mechanical configuration of the converter in a first embodiment, FIG. 5 a top view of the converter, FIG. 6 a modified formation of the embodiment according to FIG. 5, FIG. 7 a schematic illustration of a cylinder lock having an integrated converter, FIG. 8 a schematic illustration of a key for use in a cylinder lock according to FIG. 7, and FIG. 9 a schematic illustration of a key having an integrated converter.

In FIG. 1, a fixed induction coil 1 is shown which is arranged in an air gap between two permanent magnets 2 and 3, wherein the permanent magnets 2 and 3 together with the metallic enclosure 4 form the magnetic circuit 5. Here the magnetic circuit 5 is formed as movable component and can be deflected to carry out oscillations according to the double-arrow 6. The suspension of the magnetic circuit 5 is carried out by means of a leaf spring 7, which is illustrated in more detail in the following figures.

Figure 2:
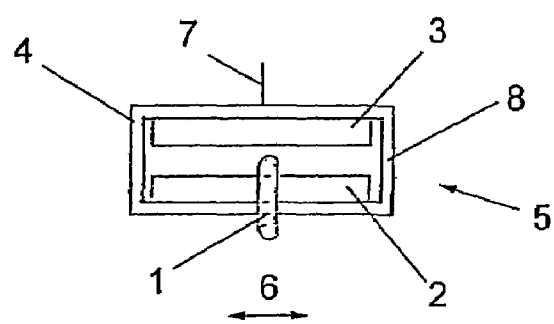

In FIG. 2, an alternative embodiment is illustrated, in which the coil 1 encompasses only the lower of the two magnets, namely the magnet denoted with 2. In the embodiment according to FIG. 1 as well as in the embodiment according to FIG. 2, the magnetic circuit 5 is formed as a closed magnetic circuit 5. Conceivable, however, is also the use of an open magnetic circuit, wherein in this case, for example, the side wall denoted with 8 would be eliminated.

Figure 3:
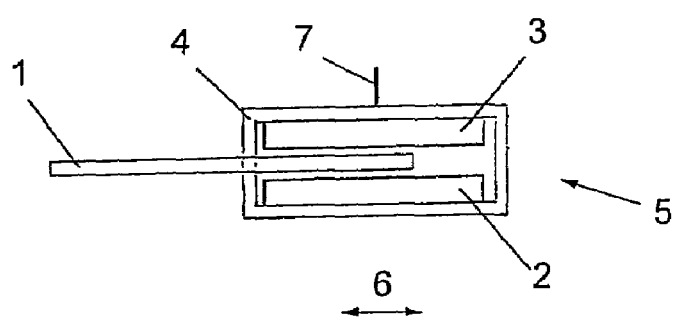

In the illustration according to FIG. 3 a further alternative embodiment is shown, in which the coil 1 is formed elongated.

Figure 4:
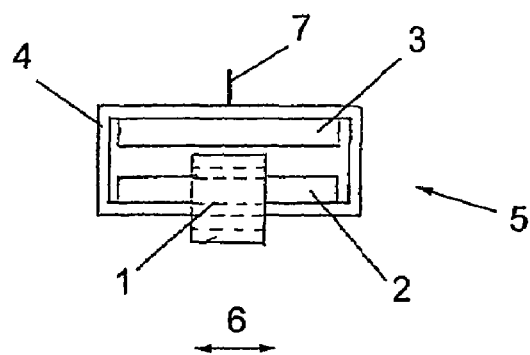

An alternative formation with a coil which is also elongated is shown in FIG. 4.

Figure 5:
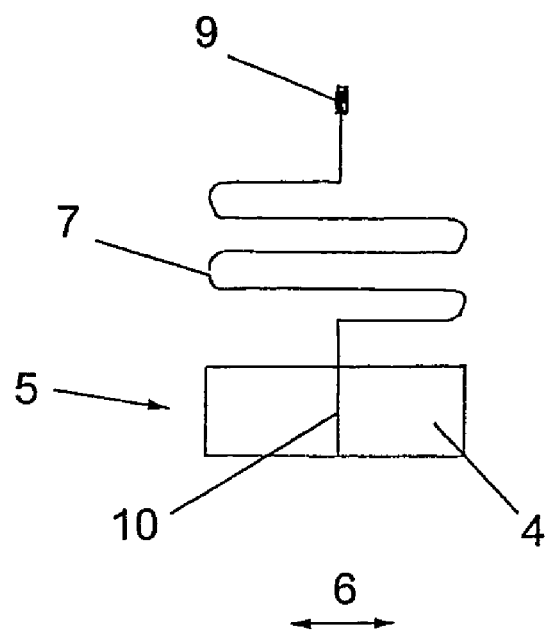

In FIG. 5 is now illustrated a top view of the magnetic circuit according to the arrow V of FIG. 1 and it is shown that the leaf spring 7 is shaped meander-like. Here it is shown that the leaf spring 7 is attached to a stationary linkage point 9 and engages approximately centrically at point 10 at the magnetic circuit 5. The oscillation movement of the magnetic circuit 5 is illustrated again by the double-arrow 6, wherein the oscillation takes place only in one plane, which in case of FIG. 5 corresponds to the drawing plane.

Figure 6:
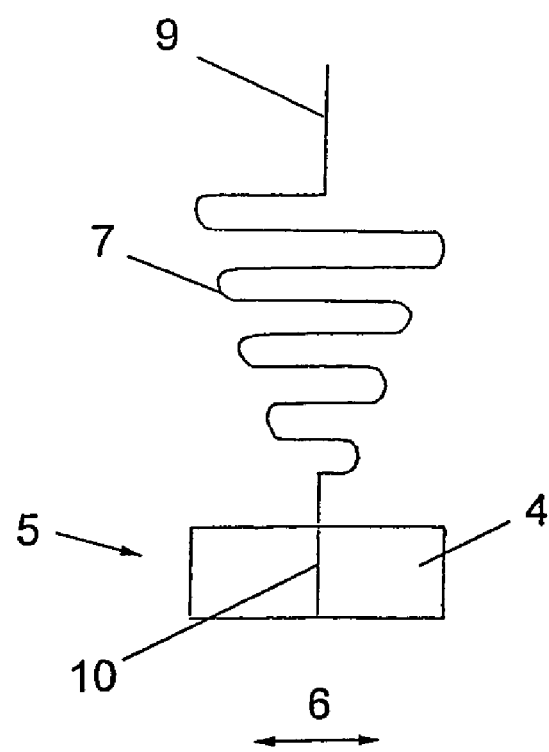

In the illustration according to FIG. 6, the leaf spring 7 is again formed meander-shaped, wherein the meander has a taper towards the engaging point 10. Thereby the space requirement for the mechanical oscillation system is reduced and the release characteristic is improved.

Figure 7:
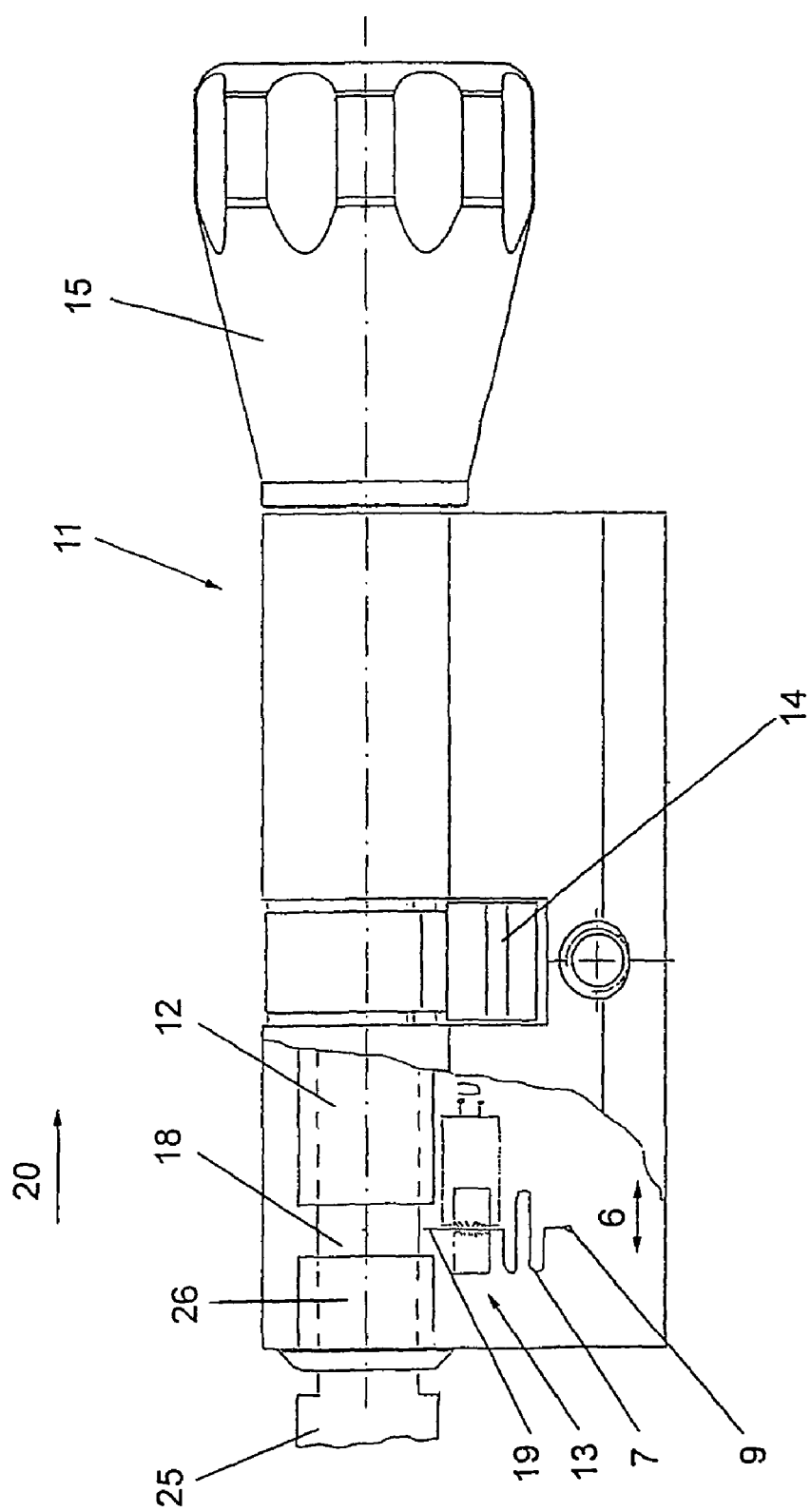
Figure 8:
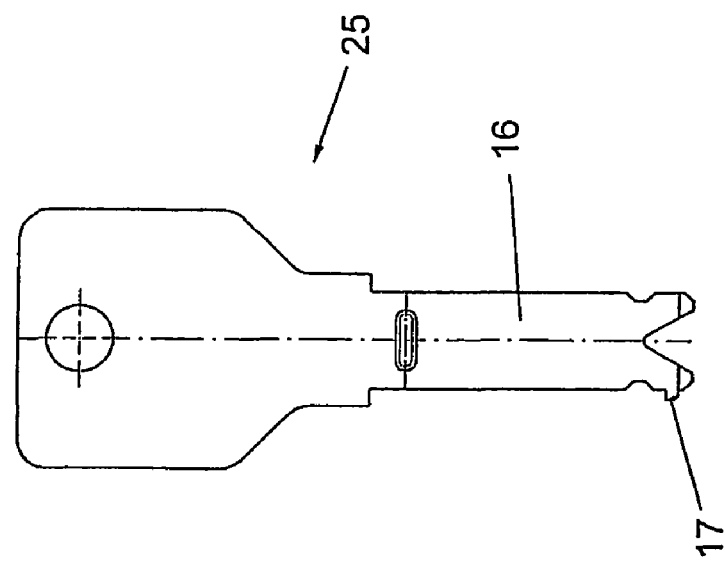

In FIG. 7 a locking cylinder 11 having a cylinder housing 12 is illustrated, in which the converter 13 according to the invention is integrated. The locking cylinder 11 has a knob 15 for actuation of the locking nose or locking element 14, respectively. On the opposite side, the cylinder core 26 has a keyway for inserting of a key, wherein the key, for example, can be formed according to FIG. 8.

The key 25 here is illustrated only schematically, wherein at the point denoted with 16, space is provided for a mechanical and/or electrical coding. The specific feature of the key 25 is the arrangement of a driver 17, wherein the corresponding cylinder core or locking cylinder 26, respectively, has a longitudinal groove on the lower side, which allows the insertion of the key 25 and provides space for the oscillating movements of the converter 13. The cylinder core 26 has a reduced core diameter at point 18, wherein a stopper 19 of the magnetic circuit projects into the room provided by the reduced core diameter 18, so that at insertion of the key 25 into the keyway the driver 17 collides with the stopper 19 and drives the same in insertion direction 20 of the key. As soon as the stopper 19 is driven in insertion direction 20 so far that it glides off the driver 17, the release of the magnetic circuit takes place, which subsequently can oscillate according to the double-arrow 6, whereby electrical energy is generated.

Figure 9:
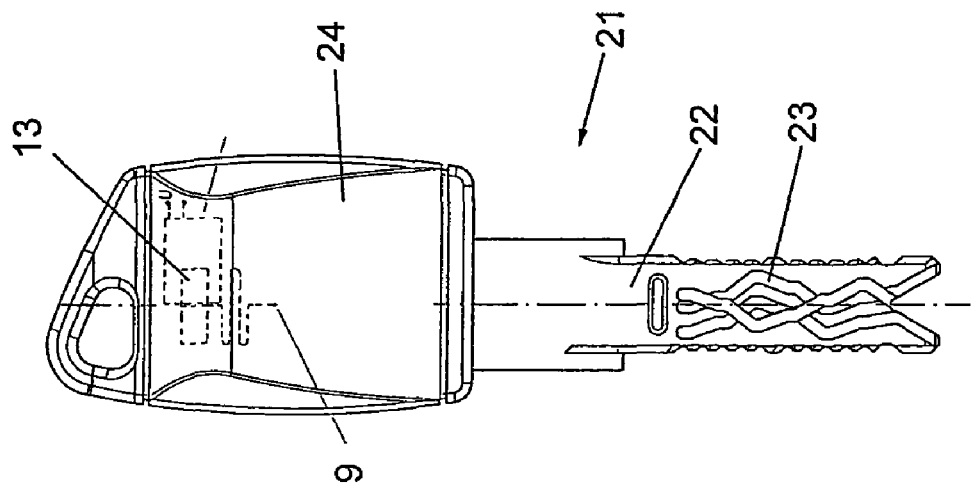

In FIG. 9 a conventional key 21 is illustrated, which carries a mechanical coding 23 at the key bit 22 and has a rim 24. In the rim 24, the arrangement of the converter 13 according to the invention is now schematically indicated, which by means of vibrations, as they occur, for example during carrying it in a trousers pocket or a purse, is caused to oscillate, whereby the mechanical energy thereby introduced into the converter system is converted into electrical energy. The electrical energy here generated can be buffered by storage elements, which are not shown in detail, and serves, for example, as a supply voltage over a long period for a control electronic of the key 25.

In addition to the above described applications, a variety of further applications is conceivable and, for example, a variety of possibilities for releasing the oscillating movements of the converter is conceivable. In addition to the previously described possibility of the cooperation of a driver arranged on a key with a stopper of the oscillating system, it is also conceivable to tension the leaf spring by means of suitable control cams, for example, by means of a rotation of the knob.

In particular with the use of magnets having a high flux density, high output voltages at the coil can be achieved so that the use of boosters or voltage multiplication circuits can be abandoned. Only with embodiments having low output voltages, which, for example, receive only mechanical energy in the form of vibrations or shocks, it can be necessary to use boosters or voltage multiplication circuits before or after the storage of the electrical energy.

The invention claimed is:

1. An apparatus for actuating a locking element, comprising:
   a converter for converting mechanical into electrical energy, said converter comprising a Magnetic circuit (5) and an induction coil (1) through which magnetic flux from the magnetic circuit passes, wherein
   a first one of the magnetic circuit (5) and the induction coil (1) is formed as a movable component relative to the apparatus and
   a respective second one of the magnetic circuit (5) and the induction coil (1) is formed as a fixed component relative to the apparatus,
   the movable component is attached to the apparatus by a leaf spring (7),
   the movable component is arranged such that the movable component is deflectable so as to carry out oscillating movements in only one plane,
   the magnetic circuit (5) comprises two permanent magnets (2, 3) arranged spaced apart in parallel to each other,
   the induction coil (1) is arranged in a space between the two magnets (2, 3) maintaining gaps between the induction coil (1) and each of said magnets (2, 3), and
   the movable component is arranged such that the movable component is deflectable so as to carry out oscillating movements in a direction transverse to a direction of the magnetic flux.

2. The apparatus according to claim 1, wherein the leaf spring (7) engages with the movable component at a position outside the oscillating plane.

3. The apparatus according to claim 1, wherein the converter (13) is arranged in a cylinder core (26) of a cylinder lock, such that the oscillating plane of the movable component is parallel to an insertion direction (20) of a key (25), wherein at insertion of the key (25), the movable component cooperates with a driver (17) of the key (25) and the movable component is deflected by the driver (17) to carry out oscillating movements.

4. The apparatus according to claim 1, wherein the converter (13) is arranged in a rim (24) of a key (25).

5. The apparatus according to claim 1, wherein the apparatus is a key.

6. The apparatus according to claim 1, wherein the apparatus is a locking cylinder.

7. The apparatus according to claim 1, wherein the leaf spring (7) has a meander shape.

8. The apparatus according to claim 7, wherein the meander shape has a taper positioned near an end of the leaf spring (7) towards the engaging point (10) between the leaf spring (7) and the movable component.

9. The apparatus according to claim 7, wherein the apparatus is a key.

10. The apparatus according to claim 1, wherein the induction coil (1) is formed as the fixed component and the magnetic circuit (5) is formed as the movable component.

11. The apparatus according to claim 10, wherein the apparatus is a key.

12. The apparatus according to claim 10, wherein the apparatus is a locking cylinder.

13. An apparatus for actuating a locking element, comprising:
   a converter for converting mechanical into electrical energy, said converter comprising a magnetic circuit (5) and an induction coil (1) through which magnetic flux from the magnetic circuit passes, wherein
   a first one of the magnetic circuit (5) and the induction coil (1) is formed as a movable component relative to the apparatus and
   a respective second one of the magnetic circuit (5) and the induction coil (1) is formed as a fixed component relative to the apparatus,
   the movable component is attached to the apparatus by a leaf spring (7),
   the movable component is arranged such that the movable opponent is deflectable so as to carry oscillating movements in only one plane, and
   the magnetic circuit (5) comprises at least one permanent magnet (2), which is encompassed by the induction coil (1).

14. The apparatus according to claim 13, wherein the apparatus is a key.

15. The apparatus according to claim 13, wherein the apparatus is a locking cylinder.

16. The apparatus according to claim 13, wherein the converter (13) is arranged in a cylinder core (26) of a cylinder lock, such that the oscillating plane of the movable component is parallel to an insertion direction (20) of a key (25), wherein at insertion of the key (25), the movable component cooperates with a driver (17) of the key (25) and the movable component is deflected by the driver (17) to carry out oscillating movements.

17. An apparatus for actuating a locking element, comprising:
   a converter for converting mechanical into electrical energy, said converter comprising a magnetic circuit (5) and an induction coil (1) through which magnetic flux from the magnetic circuit passes, wherein a first one of the magnetic circuit (5) and the induction coil (1) is formed as a movable component relative to the apparatus, and a respective second one of the magnetic circuit (5) and the induction coil (1) is formed as a fixed component relative to the apparatus, the movable component is attached to the apparatus by a leaf spring (7), the movable component is arranged such that the movable component is deflectable so as to carry out oscillating movements in only one plane, and the magnetic circuit (5) is formed as a double-sided closed magnetic circuit (5).

18. The apparatus according to claim 17, wherein the apparatus is a key.

19. The apparatus according to claim 17, wherein the apparatus is a locking cylinder.

20. The apparatus according to claim 17, wherein the converter (13) is arranged in a cylinder core (26) of a cylinder lock, such that the oscillating plane of the movable component is parallel to an insertion direction (20) of a key (25), wherein at insertion of the key (25), the movable component cooperates with a driver (17) of the key (25) and the movable component is deflected by the driver (17) to carry out oscillating movements.

21. An apparatus for actuating a locking element, comprising:

a converter for converting mechanical into electrical energy, said converter comprising a magnetic circuit (5) and an induction coil (1) through which magnetic flux from the magnetic circuit passes, wherein a first one of the magnetic circuit (5) and the induction coil (1) is formed as a movable component relative to the apparatus, and a respective second one of the magnetic circuit (5) and the induction coil (1) is formed as a fixed component relative to the apparatus, the movable component is attached to the apparatus by a leaf spring (7), the movable component is arranged such that the movable component is deflectable so as to carry out oscillating movements in only one plane, the magnetic circuit (5) comprises two permanent magnets (2, 3) arranged spaced apart in parallel to each other, the induction coil (1) is arranged in a space between the two magnets (2, 3) maintaining gaps between the induction coil (1) and each of said magnets (2,3), the leaf spring (7) has a meander shape, the meander shape has a taper positioned near an end of the leaf spring (7) towards the engaging point (10) between the leaf spring (7) and the movable component, the leaf spring (7) engages with the movable component at a position outside the oscillating plane, and the converter (13) is arranged in a cylinder core (26) of a cylinder lock, such that the oscillating plane of the movable component is parallel to an insertion direction (20) of a key (25), wherein at insertion of the key (25), the movable component cooperates with a driver (17) of the key (25) and the movable component is deflected by the driver (17) to carry out oscillating movements.

\* \* \* \* \*